(12) United States Patent
Akbarzadeh et al.

(10) Patent No.: US 8,526,684 B2
(45) Date of Patent: Sep. 3, 2013

(54) FLEXIBLE IMAGE COMPARISON AND FACE MATCHING APPLICATION

(75) Inventors: Amir Akbarzadeh, Bellevue, WA (US); Gang Hua, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 12/637,486

(22) Filed: Dec. 14, 2009

(65) Prior Publication Data

US 2011/0142298 A1    Jun. 16, 2011

(51) Int. Cl.
    *G06K 9/00*    (2006.01)
(52) U.S. Cl.
    USPC ............ 382/118; 382/218; 382/228; 382/293
(58) Field of Classification Search
    USPC .................................. 382/118, 218, 228, 293
    See application file for complete search history.

(56) References Cited

U.S. PATENT DOCUMENTS

| | | | |
|---|---|---|---|
| 7,103,211 B1* | 9/2006 | Medioni et al. ............... | 382/154 |
| 7,203,346 B2* | 4/2007 | Kim et al. ..................... | 382/118 |
| 7,630,526 B2* | 12/2009 | Bober et al. ................... | 382/118 |
| 7,657,086 B2* | 2/2010 | Gu ................................ | 382/118 |
| 7,747,045 B2* | 6/2010 | Chinen et al. ................. | 382/118 |
| 7,787,664 B2* | 8/2010 | Luo et al. ...................... | 382/118 |
| 8,015,119 B2 | 9/2011 | Buyukkokten et al. | |
| 8,284,990 B2 | 10/2012 | Ma et al. | |
| 2004/0228528 A1* | 11/2004 | Lao .............................. | 382/167 |
| 2005/0147280 A1 | 7/2005 | Yan et al. | |
| 2006/0050932 A1 | 3/2006 | Tumey et al. | |
| 2007/0183653 A1* | 8/2007 | Medioni et al. ............... | 382/154 |
| 2008/0080745 A1 | 4/2008 | Vanhoucke et al. | |
| 2008/0226174 A1 | 9/2008 | Hua et al. | |
| 2009/0022374 A1 | 1/2009 | Boult | |
| 2009/0060289 A1 | 3/2009 | Shah et al. | |
| 2009/0141950 A1 | 6/2009 | Ryu | |
| 2010/0014781 A1* | 1/2010 | Liu et al. ....................... | 382/285 |
| 2010/0172551 A1 | 7/2010 | Gilley et al. | |
| 2011/0038512 A1 | 2/2011 | Petrou et al. | |
| 2011/0142298 A1* | 6/2011 | Akbarzadeh et al. ......... | 382/118 |
| 2011/0258556 A1 | 10/2011 | Kiciman et al. | |

OTHER PUBLICATIONS

Gourier, et al., "Facial Features Detection Robust to Pose, Illumination and Identity", Retrieved at<<http://ieeexplore.ieee.org/stamp/stamp.jsp?tp=&arnumber=1398368&isnumber=30409>>, 2004 IEEE International Conference on Systems, Man and Cybernetics, pp. 617-622.

(Continued)

*Primary Examiner* — Gregory M Desire

(57) ABSTRACT

Two faces may be compared by calculating distances between different regions of the windows, and choosing one of the distances as the difference between the images. Two images are examined to detect the location of the face in the images. The faces may then be geometrically and photometrically rectified. A sliding window that is smaller than the whole face may be positioned at various locations over the images, and a descriptor is calculated for each window position. The descriptor for a window at one location in one image is compared with descriptors for windows in the neighborhood of that location in the other image. The lowest distance between window descriptors is chosen. The process is repeated for all window positions, resulting in a set of distances. The distances are sorted, and one of the distances is chosen to represent the difference between the two faces.

20 Claims, 4 Drawing Sheets

(56) References Cited

OTHER PUBLICATIONS

Seo, et al., "Range Data Registration Using Photometric Features", Retrieved at<<http://ieeexplore.ieee.org/stamp/stamp.jsp?tp=&arnumber=1467571&isnumber=31473>>, Proceedings of the 2005 IEEE Computer Society Conference on Computer Vision and Pattern Recognition (CVPR'05), 6 pages.

Lin, et al., "Recognition-based Indoor Topological Navigation Using Robust Invariant Features", Retrieved at<<http://terpconnect.umd.edu/~zhelin/papers/90_ZheLin_IROS2005.pdf>>, 2005 IEEE/RSJ International Conference on Intelligent Robots and Systems, pp. 3975-3980.

Zhou, et al., "Probabilistic Recognition of Human Faces from Video", Retrieved at<<http://www.umiacs.umd.edu/~shaohua/papers/zhou03cviu.pdf>>, Feb. 11, 2003, pp. 214-245.

Chopra, et al., "Learning a Similarity Metric Discriminatively, with Application to Face Verification", Retrieved at <<http://yann.lecun.com/exdb/publis/pdf/chopra-05.pdf>>, IEEE Society on Computer Vision and Pattern Recognition 2005, dated: Jun. 20-25, 2006, 8 pages.

Ahonen, et al., "Face Recognition with Local Binary Patterns", Retrieved at<<http://www.springerlink.com/content/p5d9xp9gfkex5gk9/fulltext.pdf>>, ECCV 2004, LNCS 3021, dated: 2004, pp. 469-481.

Belhumeur, et al., "Eigenfaces vs. Fisherfaces: Recognition using Class Specific Linear Projection", Retrieved at <<http://www1.cs.columbia.edu/~belhumeur/journal/fisherface-pami97.pdf>>, IEEE Transactions on Pattern Analysis and Machine Intelligence, vol. 19, No. 7, Jul. 1997, 1997 IEEE, pp. 711-720.

Cai, et al., "Spectral Regression for Efficient Regularized Subspace Learning", Retrieved at<<http://www.cs.uiuc.edu/~hanj/pdf/iccv07_dengcai_SR.pdf>>, IEEE 11th International Conference on Computer Vision, 2007 (ICCV 2007), Oct. 14-21, 2007, 8 pages.

Cai, et al., "Orthogonal Laplacianfaces for Face Recognition", Retrieved at<<http://www.cs.uiuc.edu/~dengcai2/Publication/Journal/TIP-OLPP.pdf>>, IEEE Transactions on Image Processing, dated Nov. 2006, 19 pages, vol. 15, issue 11.

Cai, et al., "Learning a Spatially Smooth Subspace for Face Recognition", Retrieved at<<http://www.cs.uiuc.edu/~hanj/pdf/cvpr07_dengcai.pdf>>, IEEE Conference on Computer Vision and Pattern Recognition 2007 (CVPR '07), Jun. 17-22, 2007, 7 pages.

Gao, et al., "Face Recognition Using Line Edge Map", Retrieved at<<http://ieeexplore.ieee.org/stamp/stamp.jsp?tp=&arnumber=1008383&isnumber=21743>>, IEEE Transactions on Pattern Analysis and Machine Intelligence, Jun. 2002, pp. 764-779, vol. 24, Issue 6.

Georghiades, et al., "From Few to Many: Illumination Cone Models for Face Recognition under Variable Lighting and Pose", Retrieved at <<http://vision.ucsd.edu/kriegman-grp/papers/pami01.pdf>>, IEEE Trans. on Pattern Analysis and Machine Intelligence 2001, dated 2001, 35 pages, vol. 23, No. 6.

He, et al., "Face Recognition using Laplacianfaces", Retrieved at<<http://people.cs.uchicago.edu/~niyogi/papersps/Laplacianface.pdf>>, IEEE Transactions on Pattern Analysis and Machine Intelligence, Mar. 2005, pp. 1-34, vol. 27, issue 3.

Hua, et al., "Discriminant Embedding for Local Image Descriptors", Retrieved at<<http://www.ece.northwestern.edu/~ganghua/publication/ICCV07.pdf>>, IEEE 11th International Conference on Computer Vision, 2007 (ICCV 2007), Oct. 14-21, 2007, 8 pages.

Huang, et al., "LFW Results using a Combined Nowak Plus MERL Recognizer", Retrieved at <<http://vis-www.cs.umass.edu/papers/eccv2008-merlnowak.pdf>>, Faces in Real-Life Images Workshop in European Conference on Computer Vision (ECCV), 2008, pp. 1-2.

Huang, et al., "Labeled Faces in the Wild: A Database for Studying Face Recognition in Unconstrained Environments", Retrieved at<<http://www.tamaraberg.com/papers/Huang_eccv2008-lfw.pdf>>, University of Massachusetts, Amherst, Technical Report 07-49, 2007, pp. 1-14.

Liang, et al., "Face Alignment via Component based Discriminative Search", Retrieved at<<http://research.microsoft.com/en-us/um/people/jiansun/papers/ECCV08_FaceAlign.pdf>>, Proceedings of the 10th European Conference on Computer Vision: Part II, dated 2008, 14 pages, Springer-Verlag, Berlin.

Lowe David G., "Distinctive Image Features from Scale-Invariant Keypoints", Retrieved at<<http://www.caip.rutgers.edu/~meer/TEACHTOO/PAPERS/lowe04.pdf>>, International Journal of Computer Vision 60(2), 2004, pp. 91-110, Kluwer Academic Publishers, The Netherlands.

Lucey, et al., "Learning Patch Dependencies for Improved Pose Mismatched Face Verification", Retrieved at <<http://www.ri.cmu.edu/pub_files/pub4/lucey_simon_2006_1/lucey_simon_2006_1.pdf>>, 2006 IEEE Computer Society Conference on Computer Vision and Pattern Recognition—vol. 1 (CVPR'06), Jun. 17-22, 2006, 7 pages.

Luo, et al., "Person-Specific Sift Features for Face Recognition", Retrieved at<<http://ieeexplore.ieee.org/stamp/stamp.jsp?tp=&isnumber=&arnumber=4217478>>, 2007 IEEE, ICASSP 2007, pp. 593-596.

Moghaddam, et al., "Bayesian Face Recognition", Retrieved at<<http://www.cs.columbia.edu/~jebara/papers/TR2000-42.pdf>>, Appears in: Pattern Recognition, vol. 33, No. 11, Nov. 2000, 16 pages.

Nowak, et al., "Learning Visual Similarity Measures for Comparing Never Seen Objects", Retrieved at<<http://lear.inrialpes.fr/people/nowak/dwl/cvpr07.pdf>>, IEEE Conference on Computer Vision and Pattern Recognition, 2007 (CVPR '07), pp. 1-8.

Phillips, et al., "Overview of the Face Recognition Grand Challenge", Retrieved at<<http://www.nd.edu/~kwb/PhillipsEtAlCVPR_2005.pdf>>, IEEE Computer Society Conference on Computer Vision and Pattern Recognition, 2005 (CVPR 2005), pp. 1-8.

Samaria, et al., "Parameterization of a Stochastic Model for Human Face Identification", Retrieved at<<http://ieeexplore.ieee.org/stamp/stamp.jsp?tp=&isnumber=&arnumber=341300>>, 1994 IEEE, pp. 138-142.

Sim, et al., "The CMU Pose, Illumination, and Expression Database", Retrieved at <<http://citeseerx.ist.psu.edu/viewdoc/download;jsessionid=CD0FA1DB61F739AE9DEC92A8A798571A?doi=10.1.1.13.7878&rep=rep1&type=url&i=0>>, IEEE Transactions on Pattern Analysis and Machine Intelligence, dated 2003, 9 pages, vol. 25.

Tola, et al., "A Fast Local Descriptor for Dense Matching", Retrieved at<<http://cvlab.epfl.ch/publications/publications/2008/TolaLF08.pdf>>, in Proceedings of IEEE Conference on Computer Vision and Pattern Recognition, 2008, 8 pages.

Turk, et al., "Face Recognition using Eigenfaces", Retrieved at<<http://www.cs.ucsb.edu/~mturk/Papers/mturk-CVPR91.pdf>>, 1991 IEEE, pp. 586-591.

Viola, et al., "Robust Real-Time Face Detection", Retrieved at<<http://www.vision.caltech.edu/html-files/EE148-2005-Spring/pprs/viola04ijcv.pdf>>, International Journal of Computer Vision 57(2), 2004, pp. 137-154.

Wang, et al., "Generalized Quotient Image", Retrieved at <<http://www.cbsr.ia.ac.cn/users/szli/papers/WHT-CVPR2004.pdf>>, in Proceedings of IEEE International Conference on Computer Vision and Pattern Recognition, 2004, pp. 1-8.

Winder, et al., "Learning Local Image Descriptors", Retrieved at<<http://people.cs.ubc.ca/~mbrown/papers/cvpr2007b.pdf>>, IEEE Conference on Computer Vision and Pattern Recognition, 2007 (CVPR '07), 8 pages.

Wiskott, et al., "Face Recognition by Elastic Bunch Graph Matching", Retrieved at<<http://www.face-rec.org/algorithms/EBGM/WisFelKrue99-FaceRecognition-JainBook.pdf>>, in Intelligent Biometric Techniques in Fingerprint and Face Recognition (eds. L.C. Jain et al.), dated 1999, pp. 1-23, Chapter 11, CRC Press.

Wolf, et al., "Descriptor based Methods in the Wild", Retrieved at<<http://www.openu.ac.il/home/hassner/projects/Patchlbp/WolfHassnerTaigman_ECCVW08.pdf>>, in Faces in Real-Life Images Workshop in European Conference on Computer Vision (ECCV) (2008), pp. 1-14.

Wright, et al., "Implicit Elastic Matching with Randomized Projections for Pose-Variant Face Recognition", Retrieved at <<http://www.ece.northwestern.edu/~ganghua/publication/CVPR09a.pdf>>, IEEE Conference on Computer Vision and Pattern Recognition, 2009 (CVPR 2009), Jun. 20-25, 2009, 8 pages.

Zhang, et al., "Multiple-Instance Pruning for Learning Efficient Cascade Detectors", Retrieved at<<http://books.nips.cc/papers/files/nips20/NIPS2007_0575.pdf>>, NIPS 2007, Dec. 2007, pp. 1-8, Vancouver, Canada.

Gross, et. al., "Information Revelation and Privacy in Online Social Networks (The Facebook Case)", Retrieved at<<http://www.twine.com/_b/download/1138zj78w-4rv/b0bsl79jx59rwtw7lr978psshbdk7tsxlb1w4wlpmfhprmt/1138zj78w-4rv/b05dtk7whd6v9wmty1t3vgx8zl0g1jr45t8m5gxyvfic/infomraiton_revelation_and_privacy_in_onlibne_social_networking%252C_gross_and_aquisti.pdf>>, ACM Workshop on Privacy in the Electronic Society (WPES), Nov. 7, 2005.

Klein, Gabriel, "Networking People", Retrieved at<<http://www.nuage.ch/projets/networking/KleinGabriel-NetworkingPeople.pdf>>, dated: Sep. 30, 2004, pp. 1-56.

Huang, et al., "Beyond Memories: Weaving Photos into Personal Social Networks", Retrieved at<<http://people.ict.usc.edu/~pynadath/MOO-2006/huang.pdf>>, in Modeling Others from Observations: Papers from the 2006 AAAI Workshop, volume Technical Report WS-06-13. dated: 2006, 8 pages, The AAAI Press, Menlo Park, California.

Huang, et al., "Agent-Mediated Personal Photo Sharing", Retrieved at<<http://ntur.lib.ntu.edu.tw/bitstream/246246/154563/1/18.pdf>>, International Journal of Electronic Business Management, pp. 11-18, dated: 2007, vol. 5, No. 1.

Li, et al., "New Challenges in Multimedia Research for the Increasingly Connected and Fast Growing Digital Society", Retrieved at<<http://staff.science.uva.nl/~smeulder/pubs/MIR2007Li.pdf>>, MIR'07, Sep. 28-29, 2007, pp. 1-8, Augsburg, Germany.

Vivek, et al., "Robust Hausdorff distance measure for face recognition", in Pattern Recognition 40 (2007), pp. 431-442.

Takacs, Barnabas, "Comparing Face Images Using the Modified Hausdorff Distance", in Pattern Recognition, dated: 1998, pp. 1873-1881, Elsevier Science Ltd., Great Britain.

Hua, et al., "A Robust Elastic and Partial Matching Metric for Face Recognition", Twelfth IEEE Conference on Computer Vision 2009 (ICCV2009), 8 pages.

Office Action in U.S. Appl. No. 12/637,494 (U.S. Published Application No. 20110142299), text of Office Action plus lists of cited references, Nov. 26, 2012, 15 pages.

Notice of Allowance in U.S. Appl. No. 12/637,494 (U.S. Published Application No. 20110142299), text of Notice of Allowance plus list of cited references, Apr. 18, 2013, 10 pages.

* cited by examiner

FLEXIBLE IMAGE COMPARISON AND FACE MATCHING APPLICATION

CROSS-REFERENCE

This application is related to U.S. patent application Ser. No. 12/637,494, entitled "Recognition of Faces Using Prior Behavior," filed on the same date as this application.

BACKGROUND

Face recognition can be performed by comparing two images to determine whether they show faces of the same person. For a given person whose identity is known, there may be a reference image of that person's face. In order to determine whether some new image (the "candidate" image) shows that same person's face, the face in the candidate image is compared with the face in the reference image. If the two faces have some threshold level of similarity, then the faces are deemed to be those of the same person.

A problem that arises in comparing images of faces is that images can vary widely in how they show the same person's face. Certain types of photos, such as passport photos or drivers license photos, are created to meet specific standards—e.g., the photos is a rectangle of a certain size, the head fits in a certain circle within that rectangle, the lighting meets certain parameters, and so on. It is relatively easy to compare facial features on photos that meet these kinds of exacting standards. However many photos are not taken to such exacting standards. For example, candid photos may capture a person's face at an oblique angle. Or lighting may be excessive or deficient. Or portions of the face may be occluded by objects or people in the photo. Comparing faces in these types of photos with a face in a reference image presents a challenge.

Various techniques exist to normalize the appearance of faces in order to facilitate comparison. For example, the face may undergo some sort of spatial alignment and/or lighting correction prior to comparison. However, even when such techniques are used, the same person's face may be significantly different in two photos. These differences may make it difficult to compare the faces, and to produce a reliable indication of whether the two faces are images of the same person.

SUMMARY

Two images may be compared to determine whether they have the same face. In order to compare the faces in two images, the images may be normalized as follows. Initially, the image may be evaluated to determine the approximate rectangular boundary in which the face is located, and these rectangular boundaries may be resized to some pre-determined size, such as a rectangle of 128×128 pixels.

The images may then undergo geometric and photometric rectification. In order to geometrically rectify the image, the positions of the eyes in the images are detected, so that the eyes may be used as reference points. The images may then be warped so as to put the eyes in alignment. Since the size and location of eyes tend to satisfy known relationships to other parts of the human face, alignment of the eye positions tends to put the other features of the face in good alignment with each other. The image then may be photometrically rectified, so as to emphasize detail in the image, such as the lines that define the face. Photometric rectification may correct issues such as lighting effects by removing low-frequency information from the image. One way of removing the low frequency information is to pass the image through two Gaussian blur kernels with different standard deviations. Since the blurs are different from each other, subtracting one blurred image from the other results in an image that contains mainly the high frequency information (the detail) from the original image. Thus, following geometric and photometric rectification of the images to be compared, the result is two images of the same size, where the faces in the images are in approximate spatial alignment with each other and which have been corrected for lighting effects.

The images then may be compared as follows. A sliding window is moved over the image, and a descriptor is calculated for each window. A window is a region that is smaller than the entire image. For example, an 18×18 pixel window could be moved over the 128×128 image. Windows may be positioned to overlap to some degree—e.g., an 18×18 window could be moved two pixels at a time in the horizontal and/or vertical directions, so that each time the window is moved, much (but not all) of the information that lies in the window is the same as the information contained in the last window position. The descriptor that is calculated for each window is an encapsulation of the visual information contained in that window, and descriptors may be compared to determine how different they are from each other (and, consequently, how different the windows that they describe are from each other). For each image to be compared, the window is moved over the entire image, and a descriptor is calculated for each position of the window.

After descriptors have been calculated for each window position, corresponding descriptors in the two windows are compared. However, some elasticity is built into the comparison process, so that a given window in one image can be compared to the window at the same position in the other image, but also to other windows in the neighborhood of that window. So, the window at position (10,10) (using rectangular coordinates) in one image may be compared with the window at position (10,10) in the other image, but might also be compared with windows at positions such as (8,8), (8,10), (8,12), (10,8), (10,12). This flexible comparison reflects the fact that the closest match for window (10,10) in one image might be found somewhere near position (10,10) in the other image, even if the closest match is not in exactly the same spot. For example, a nose might appear very close to the center of window (10,10) in one image, but the window that has the nose closest to the center in another image might be the window at (8,10). The distance between any pair of descriptors may be calculated. Such a distance is calculated between a given window in one image and each of the windows in that neighborhood of the other image. After these descriptors are calculated, the descriptor with the lowest value is taken to be the distances between the images for a given window. So, for example, if window (10,10) in a first image is compared with neighborhood windows in a second image, and it turns out that window (8,10) in the second image has the lowest distance to window (10,10) in the first image, then the distance between those two windows is recorded as the distance between the images at window (10,10) (even though one of the windows being compared is not located at (10,10)).

Once distances have been calculated for all of the different window positions, the distances are sorted from lowest to highest. A value, alpha, is chosen that represents the percentile among the sorted distances that will be chosen as the distance between the two images as a whole. For example, an alpha value of zero means that the zero-th percentile distance in the sorted list (i.e., the lowest distance among all of the window distances) will be chosen as the distance between the two images. In such a case, two images would be deemed to be very similar to each other as long as they have at least one similar window. At the other end of the spectrum, an alpha value of 100% would choose the highest distance in the sorted list. In such a case, the distance between two images would be taken to be the distance between the windows that have the greatest difference between them, so images that have even one dissimilar window would be deemed to be very dissimilar from each other. In one example, alpha is chosen somewhere between zero and 100% (e.g., 20%), so that two images might be deemed similar if they have some similar windows, even if they also have some dissimilar windows.

Once a distance between the two facial images is calculated, that distance may be used to decide whether the faces are of the same person. For example, a threshold could be defined, and two images whose distance metric exceeds that threshold could be determined to show faces of different people, while images whose distance metric is less than or equal to the threshold could be deemed to show the same person's face.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
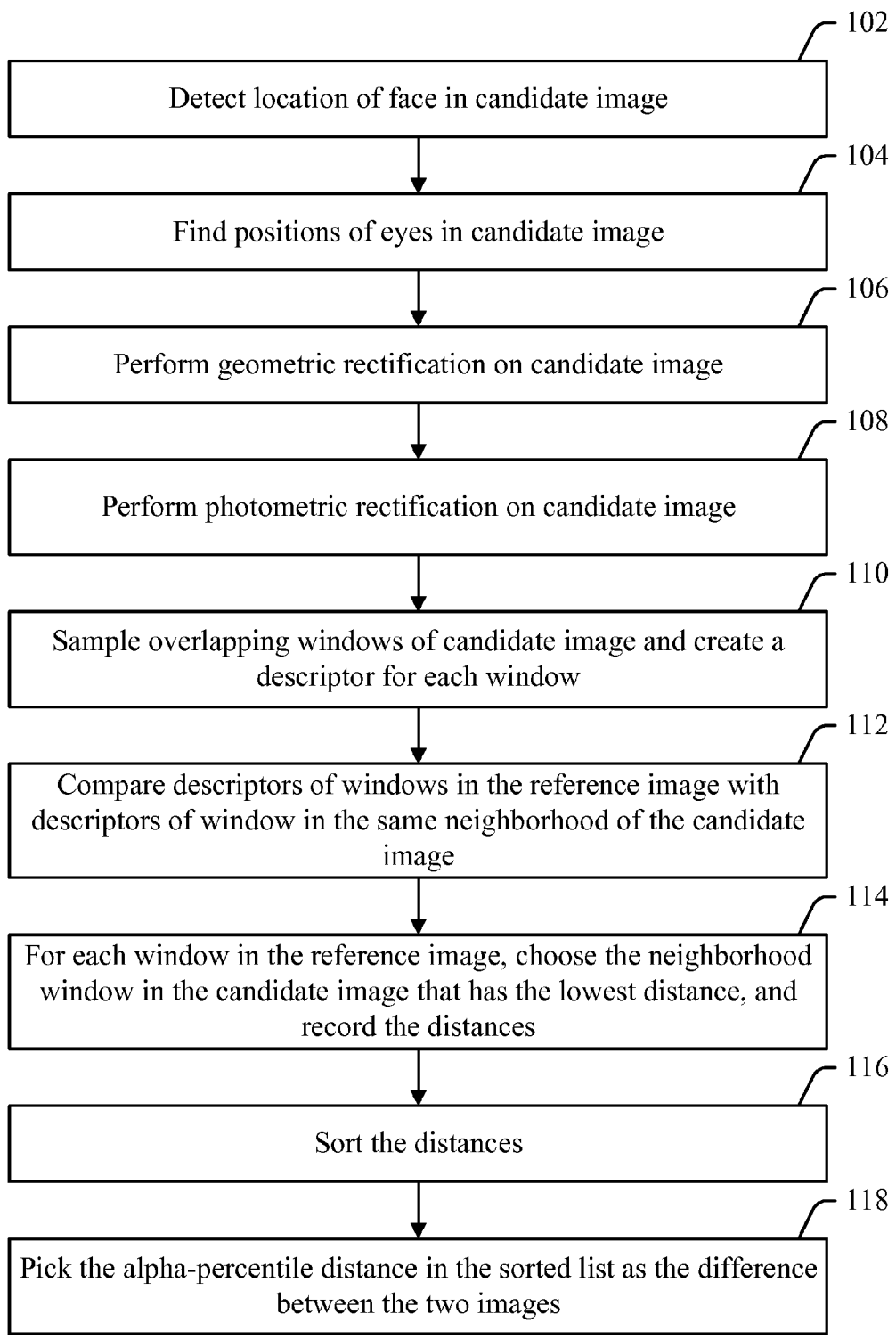
FIG. 1 is a flow diagram of an example process of comparing photos of two faces.

The subject matter described herein provides a way to compare images of faces. The techniques described herein may be used to recognize when two images show the same face, even when one or both of the images contain various kinds of differences. For example, one photo may have an occluded area while the other does not. The two photos may have different lighting. The photos may have been taken at different angles, or may show different facial expressions. When techniques herein are used to compare photos, it may be possible to recognize that two photos show the same person's face even if the photos have some or all of the above-mentioned differences, or other types of differences.

Techniques provided herein compare the faces in two images by separately comparing different regions of the image, and determining whether there are enough similar regions to conclude that the two images show the same person's face. The images to be compared are normalized in various ways. The rectangle that approximately bounds the face in an image is detected. This rectangle is extracted from the image, and magnified or demagnified to a particular size. Then the images are geometrically and photometrically rectified. Geometric rectification warps one image so that the position of the face in that image approximately matches the images of the face in the other image. Geometric rectification may be performed by detecting the positions of the eyes in the two faces, and warping one or both of the faces to change the positions of the eyes so that the eye positions match. This rectification tends to correct for pictures that were taken at oblique angles. Photometric rectification is also performed. In order to perform photometric rectification, two blurred versions of the image are calculated. The difference between the two blurred versions is then calculated, and the resulting different contains primarily the high-frequency information from the original image—i.e., the detail. Both images to be compared are rectified in this way, and then the comparison proceeds as follows.

A window that is smaller than the overall images to be compared is moved across those images. The different positions to which the window is moved may overlap with each other. For each window position, a descriptor of the visual material at that position is captured, resulting in a matrix that represents, for each image, the descriptors for various window positions. The descriptors of corresponding positions are then compared, and a distance is calculated for each window position. However, when the distance is calculated, a descriptor of one image is compared not only to the descriptor for the exact same position in the other image. Rather, the descriptor is also compared with descriptors from the neighborhood of that position—e.g., windows located a few pixels to the left, right, up, or down. So, for example, if the window at position (10,10) in the first image is being considered, the distance may be calculated between that window's descriptor and the descriptor for window (10,10), in the second image. However, window (10,10) in the first image may also be compared with nearby windows in the second image—e.g., window (8,10), window (8,12), and so on. Whichever window in the second image in that neighborhood has the smallest distance to the window being considered from the first image is taken to be the distance between the images at the location of that window. So, for example, if window (8,10) in the second image has the smallest distance to window (10,10), in the first image, then that distance is recorded as the distance between the two images at location (10,10). Such a distance is calculated for each location, resulting in a set of distances between the two windows for different locations. The distances may then be sorted from lowest to highest, and one of the distances is chosen to represent the difference between the two images. (In another example, a particular distance may be chosen without sorting the distances.)

The actual distance that is chosen to represent the image distance is based on a parameter, alpha. Alpha is a percentile that represents how far to the right in the sorted list the representative value will be chosen. For example, an alpha value of zero indicates that the left-most (i.e., smallest) value in the sorted list will be chosen to represent the difference between two images. In this case, if the images have even one similar window, then the images themselves will be deemed similar to each other. At the other extreme, an alpha value of 100% would choose the highest distance in the sorted list, so two images would be considered dissimilar to each other if they have even one dissimilar window. An alpha value somewhere between zero and 100% may be chosen, so that images could be considered similar to each other if they have a sufficient number of windows in common, without insisting that the images be similar everywhere. (Using an algorithm such as QuickSelect, the alpha-th percentile distance can be chosen without sorting the list.)

Turning now to the drawings, FIG. 1 shows an example process of comparing photos of two faces. In the process of FIG. 1, it is assumed that two images are being compared to determine whether they contain the same face. In the description of FIG. 1, one of these images is referred to as the "reference image," and the other is referred to as the "candidate image." Typically, the reference image is an image that has already been established to be an image of a particular person's face. The candidate image is typically an image that is being compared to the reference image to determine whether the candidate image is a picture of the same person as the reference image. However, the process described in FIG. 1 can be performed to compare any images.

At 102, the candidate image is examined to detect the location of a face in the image. For example, the image could be a photograph, of which a small portion is a face. Thus, at 102, the particular portion of the image that contains a face is identified.

At 104, the face in the candidate image is examined to identify the positions of the eyes. Identification of the eyes may be performed by any eye detection algorithm. The positions of the eyes are used to perform geometric rectification on the candidate image at 106. That is, the candidate image is resized and warped so that the eyes in the candidate image appear at the same position as the eyes in the reference image. Aligning the eyes in the candidate and reference image facilitates comparison between the two images.

At 108, photometric rectification is performed on the candidate image. In general, photometric rectification removes low frequency material from the candidate image. Removing low frequency material from the image corrects for certain lighting effects in the image, which facilitates comparison of images. An example technique for performing photometric rectification will be described below.

At 110, overlapping windows of the candidate image are sampled, and a descriptor is created for each window. For example, 4-pixel-by-4-pixel (4×4) squares of the candidate image could be evaluated, and a vector that describes each square could be created. The 4×4 pixel window could be moved both horizontally and vertically across the image one pixel at a time, so that the window will be evaluated—and a descriptor will be created—for every contiguous 4×4 pixels square within the candidate image. (Of course, the 4×4 window size is an example; any window size could be used). Similarly, windows of the reference image are evaluated, and descriptors are created for the reference windows.

At 112, descriptors of windows in the reference image are compared with descriptors of windows in the same neighborhood of the candidate image. For example, consider a window in the reference image whose uppermost, leftmost corner is pixel (i,j) in a rectangular coordinate system. (Since a specific corner of a square window defines the location of the window itself, such a window could be referred to as "window (i,j)".) A neighborhood could be defined as (i,j), plus or minus two pixels in all directions. Therefore, the window (i,j) in the reference image may be compared to all windows that are within two pixels of (i,j) in the candidate image. That is, window (i,j) in the reference image could be compared with all windows in column i−2 in the candidate image (i.e., (i−2,j−2), (i−2,j−1), . . . , (i−2,j+2)), then all windows in column i−1 in the candidate image ((i−1,j−2), (i−1,j−1), . . . , (i−1,j+2)), and so on through column i+2 (i.e., (i+2,j−2), (i+2,j−1), . . . , (i+2,j+2)).

A distance is then calculated between the descriptor for window (i,j) in the reference image and the descriptors for each of the corresponding neighborhood windows in the candidate image. Among those distances, the lowest distance is chosen, and that lowest distance is taken to be the distance between the reference image and the candidate image at window (i,j) (at 114). For example, suppose that window (i,j) in the reference image is compared to the set of neighborhood windows, described above, in the candidate image. Further suppose that, after all of those comparisons have been made, the window in the candidate image with the lowest distance to reference image window (i,j) is window (i−2,j+1). Then the distance between window (i,j) in the reference image and window (i−2,j+1) in the candidate image is recorded as being the distance between the two images at window (i,j).

In the manner described above, a distance between the reference and candidate image is found for each window. At 116, the set of distances is sorted. For example, the distances could be put in a line from lowest to highest.

At 118, the sorted list is examined, and the distance that lies at the alpha-th percentile in the sorted list is chosen as the distance between the reference image and the candidate image. Alpha is a parameter that is provided to control how many differences can be tolerated between two images while still allowing the images to be called similar to each other. Alpha is typically a value between zero and one. Since the distances between windows are sorted from lowest to highest, an alpha value of zero picks the zero-th percentile distance in this sorted list as the distance between two images—i.e., the smallest distance between any pair of corresponding windows in the images. In effect, therefore, an alpha value of zero implies that two images would be deemed to have a low distance between them if any portions of the two images are similar to each other. On the other end of the spectrum, an alpha value of one would pick the 99-th percentile distance in the sorted list—i.e., the largest distance between any pair of corresponding windows in the images. In effect, therefore, an alpha value of one implies that two images would be deemed to have a high distance between them if the images have any dissimilar spatial regions. An alpha value somewhere between zero and one would pick a distance somewhere in the middle of the list. In effect, such an alpha value would allow images to be deemed similar (i.e., to have a low distance between them) as long as they have several spatial regions that are similar to each other.

FIGS. 2-7 illustrate various aspects of the flow chart blocks described above. With reference to FIGS. 2-7, the following is a further description of some of the blocks in FIG. 1.

Figure 2:
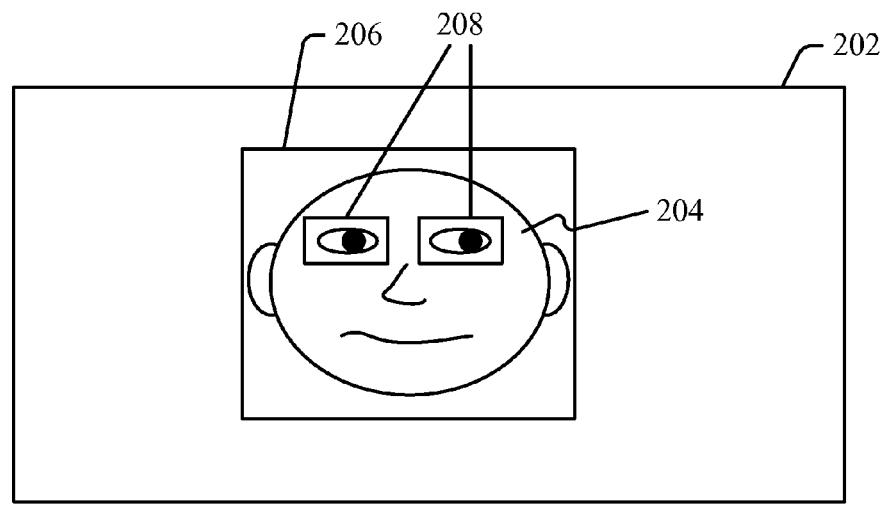
FIG. 2 is a block diagram of an image that contains a face, which illustrates aspects of face detection and eye detection.

FIG. 2 shows an image that contains a face, and illustrates how the location of the face and eyes are determined (blocks 102 and 104 of FIG. 1). Image 202 is any type of digital image, such as one that has been captured with a digital camera. As shown in the example of FIG. 2, face 204 may take up much of image 202. However, in another example, there could be many objects in image 202, in which case face 204 might take up a relatively small area of image 202. Since the process described in FIG. 1 may be used to compare faces harvested from any type of image, face detection is performed on image 202. There are various known face detection algorithms. Any of these algorithms (e.g., the Viola-Jones face detector) may be used to detect the location of face 204. In the example of FIG. 2, the face 204 contained in image 202 is roughly coextensive with rectangle 206. Thus, rectangle 206 identifies the location of face 204 in image 202.

Once the location of face 204 has been identified, eye detection may be performed on face 204. In the analysis of faces, eyes play a role since they can be used to orient and scale the geometry of a face. For example, it is true that a person's eyes are approximately the same width as each other, and are separated by a distance that is approximately equal to the width of each eye. It is also true that the corners of the eyes lie approximately in a horizontal line across the face. These features of the human face are examples of geometric facts that can be used to orient and scale the face, if the positions of the eyes are known. Thus, an eye detection algorithm is applied to face 204, and the algorithm may detect that the eyes are located in the positions indicated by rectangles 208.

Figure 3:
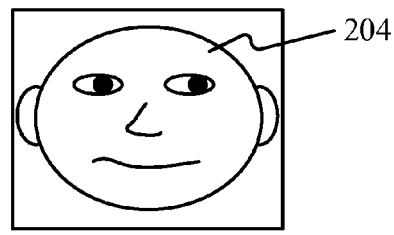
FIG. 3 is a block diagram of an image of a face, which illustrates aspects of geometric rectification.

FIG. 3 shows a normalized image of a face, following geometric rectification (block 106, FIG. 1). In order to compare images of two faces, the comparison is simplified if the images are the same size (i.e., if the images have the same number pixels in both the vertical and horizontal dimensions), and if the position and size of the face in each image has been made relatively consistent. As noted above, the process of FIG. 1 may be used to compare a candidate image with a reference image. Typically, the reference image has been normalized in some manner, and thus the candidate image is geometrically rectified to make its size and orientation more like that of the reference image. For example, the reference image might be a person's passport photo or driver's license photo, which has been created in such a manner that the position and size of the face in the photo conforms to certain metrics. However, the candidate image might be a candid photo. In such a candid candidate photo, therefore, the face might take up a small portion of the image, or might be at an angle. Therefore, geometric rectification attempts to normalize the size and orientation of the face in the image by enlarging or shrinking the image, and by warping the image, in such a manner that the eye positions of the face in the candidate image match (as closely as practical) the eye positions of the face in the reference image. FIG. 3 shows the same face 204 that is shown in FIG. 2, but it has been normalized to a standard size (as represented by the smaller image that appear in FIG. 3 as compared with FIG. 2). Although the difference between FIGS. 2 and 3 does not represent any warping of face 204, it is noted that geometric rectification may both warp and scale the image in order to cause the eye positions to match.

In addition to geometric rectification, photometric rectification may also be performed on the image (block 108, FIG. 1). Photometric rectification removes much of the low frequency material from an image, leaving only the detail in the image. At an intuitive level, removing the low frequency material from an image makes a photograph look more like a line drawing. High frequency material is generally associated with detail—e.g., the boundary between a face and the background, or the boundary between the eyes and the brow. Low frequency material, on the other hand, is typically associated with features such as shading or lighting. Since a face is defined by its detail, not by the light that was available when the image of the face was captured, removing the low frequency material allow the information that actually distinguishes one face from another to be compared across two images, without the distraction of lighting effects.

In order to perform photometric rectification, the face (e.g., the geometrically rectified face 204, shown in FIG. 3) is passed through a Difference of Gaussian (DoG) filter. That is, if one starts with an image $\mathcal{I}$, then the photometrically-rectified image $\hat{\mathcal{I}}$ is produced by applying two separate Gaussian blur kernels to the image to produce two different blurred images, and then subtracting one from the other. In other words, if $\mathcal{I}_{\sigma_1}$ and $\mathcal{I}_{\sigma_2}$ images created by applying Gaussian blur kernels with standard deviations of $\sigma_1$ and $\sigma_2$, respectively, to image $\mathcal{I}$, then $\hat{\mathcal{I}} = \mathcal{I}_{\sigma_1} - \mathcal{I}_{\sigma_2}$. In one example, $\sigma_1=0$ and $\sigma_2=1$. Intuitively, what happens in the photometric rectification process is that a version of an image that contains primarily low-frequency material (i.e., $\mathcal{I}_{\sigma_2}$), is subtracted from a version of an image that contains both low- and high-frequency material, (i.e., $\mathcal{I}_{\sigma_1}$), so the resulting difference (i.e., $\hat{\mathcal{I}}$) contains primarily high-frequency material. The reason this works is that that $\mathcal{I}_{\sigma_1}$ is less blurred than $\mathcal{I}_{\sigma_2}$.

Once an image has been geometrically and photometrically rectified, overlapping windows of the reference and candidate images are evaluated, and a descriptor is assigned to each widow (block 110, FIG. 1). In order to partition an image into overlapping windows, a window size is first defined. In one example, the window size is a square of 18×18 pixels, although any size could be used. If the image to be evaluated has more than 18 pixels in the vertical and horizontal dimensions, then the 18×18 pixel window does not cover the entire image, so the image can be covered by shifting the window across and down the image, s pixels at a time. (In one example, s=2, although any value of s could be used.) For purposes of illustration, FIG. 4 shows an example in which a 3×3 pixel window is used, and an image is sampled by shifting this window, one pixel at a time, across and down the window.

Figure 4:
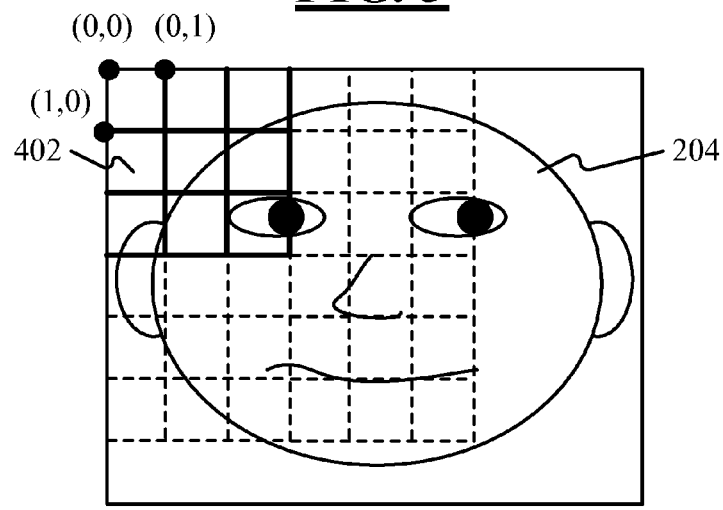
FIG. 4 is a block diagram of an image of a face, which illustrates aspects of sampling the image at overlapping windows.

The image shown in FIG. 4 contains face 204. Window 402 is show by the bold, solid cross-hatch pattern. Window 402 is a 3×3 pixel window, so each square in the bold cross-hatch pattern represents one pixel of the window. Initially, window 402 is placed at point (0,0). The choice of coordinates is arbitrary, but in one coordinate system, a pixel's location is defined based on how many pixels away it is from the uppermost, leftmost corner. Thus, the pixel that appear in the uppermost, leftmost corner is (0,0) (i.e., zero pixels lower than the uppermost row, and zero pixels to the right of the leftmost column). Since window 402 is of fixed size, the location of a window can be defined by the position of the window's uppermost, leftmost corner. Therefore, when window 402's uppermost, leftmost corner is at pixel (0,0), we may describe the window as being at (0,0), although it will be understood that, at this position, the window actually covers pixels (0,0), (0,1), (0,2), (1,0), (1,1), (1,2), (2,0), (2,1), and (2,2).

In order to sample the image shown in FIG. 4, window 402 is initially placed at point (0,0), and a descriptor is calculated for the image information that appears in that window. Any sort of descriptor may be used. In one example, the descriptor is a Winder-Brown descriptor, which accumulates four-dimensional histograms of rectified image gradients $\{|\nabla_x|-\nabla_x, |\nabla_x|+\nabla_x, |\nabla_y|-\nabla_y, |\nabla_y|+\nabla_y\}$, over nine spatial pooling regions. In general, the descriptor describes features of the portion of an image contained in a window. After this descriptor is calculated, window 402 is moved s pixels to the right. As noted above, in one example, an 18×18 window is used and s=2. In the example of FIG. 4, for purposes of illustration, s=1 so window 402 is shifted one pixel to the right. Thus, window 402 is moved to position (0,1) (with the first number in the order pair representing the row, and the second number representing the column), so that its right-hand boundary lies on the dotted line immediately to the right of the solid line, and a new descriptor is calculated for that location. As can be seen much of the material in the window at this position will overlap with the window's original position. The window is then successively moved one pixel to the right. After horizontal movement of window 402 across the image has been exhausted, the window is moved downward. For example, the window may be returned to the left side of the image, and then may be moved to the second row so that the window takes the position (1,0) (with the first number in the order pair representing the row, and the second number representing the column).

If the window is moved s pixels at a time, then assume that the number of different placements of the window in the horizontal dimension is K and that the number of placements in the vertical dimension is likewise K. Then, the result of the sampling process described above is a K×K matrix of descriptors. That is, if $\vec{f}_{mn}$ is the descriptor calculated from the window located at (m, n) then the matrix F=[$\vec{f}_{mn}$], 1<m<K, 1<n<K contains all of the descriptors for all of the windows in an image. As noted above, the process of evaluating windows of an image may be carried out for both the candidate image and the reference image, resulting in a matrix for each image. In the description that follows these two matrices may be referred to as $F^{(1)}$ and $F^{(2)}$.

In order to determine the difference between two images, the descriptors of the two images are compared pairwise to calculate distances between corresponding descriptors. However, since the different parts of two images might not correspond exactly, some "play" is allowed in the comparison. For example, suppose that we are trying to determine the distance between the descriptors for window (4,4) in two images. We may start by looking descriptor $\vec{f}_{44}$ in the matrix for the reference image (matrix $F^{(1)}$). Using a distance metric, it is possible to calculate the distance between that descriptor and the corresponding $\vec{f}_{44}$ descriptor in the matrix for the candidate image (matrix $F^{(2)}$). However, it is possible that $\vec{f}_{44}$ in matrix $F^{(2)}$ might not be the relevant comparison with $\vec{f}_{44}$ in matrix $F^{(1)}$. Suppose, for example, window (4,4) in the reference image has the right corner of a person's mouth exactly at its center. It is possible that window (4,4) in the candidate image also has the right corner of a person's mouth exactly at its center, but it is also possible that the right corner of the mouth in the candidate image is actually in the center of some other window—e.g., window (3,3), window (4,2), etc. Assuming that the right corner of the mouth is not occluded in the candidate image, it is likely that the corner appears in the center of some window that is near window (4,4), but that window might not be window (4,4) itself. Therefore, in comparing two images, a descriptor for a window in one image is compared with the descriptor for that same window in the other image, and also with descriptors for nearby windows. For example, we might consider windows that are up to four pixels away in the vertical or horizontal dimensions. A comparison of a window of one image with windows in the same neighborhood of another image is the type of comparison described in blocks 112 and 114 of FIG. 1. An example of such a comparison is shown in FIG. 5.

Figure 5:
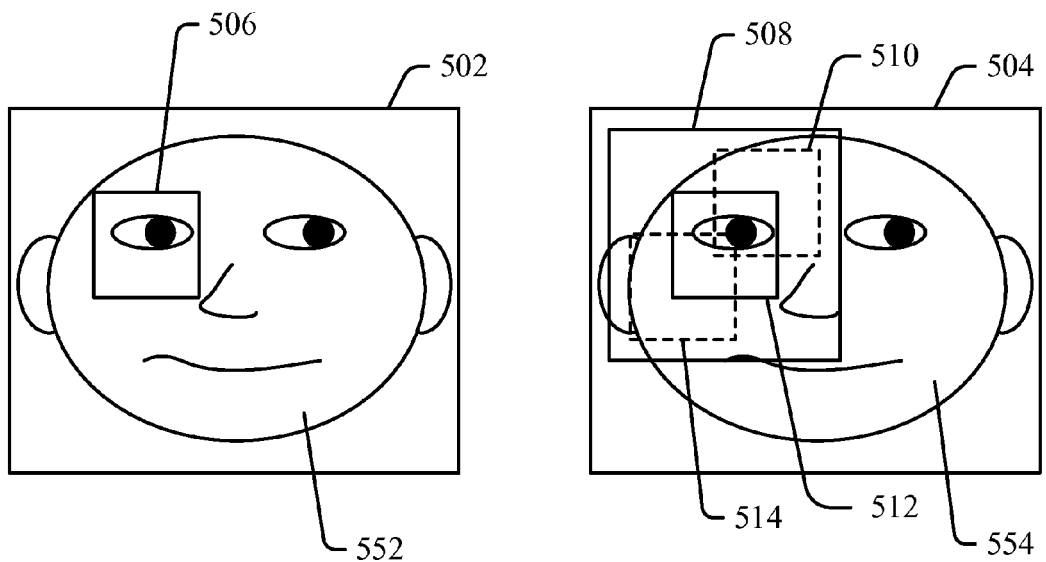
FIG. 5 is a block diagram of a reference image and a candidate image, which illustrates aspects of neighborhood comparison of windows.

In FIG. 5, the two images to be compared are images 502 and 504. Image 502 contains face 552, and image 504 contains face 554. (In one example, images 502 and 504 are being compared to determine whether the respective faces that they contain are of the same person.)

Window 506 is a window of image 502. For example, window 506 might be located at a location (i,j) within image 502. Window 512 is a window of image 504. Window 512 is located at location (i,j) in image 504. In other words, windows 506 and 512 are at the same spatial position within their respective images. The descriptor for window 506 is compared with the descriptor for window 512. However, the descriptor for window 506 is also compared with the descriptors for windows in the neighborhood 508 of window 512. As shown in FIG. 5, neighborhood 508 has window 512 roughly at its center. However, neighborhood 508 also contains windows 510 and 514 (as well as, possibly, other windows, not shown). Window 506 is also compared to windows 510 and 514 (and, possibly, to the other unshown windows in neighborhood 508). Whichever window in neighborhood 508 has a descriptor with the lowest distance to the descriptor of window 506 is retained as the distance between the two images at location (i,j). It is noted that whichever window in neighborhood 508 has the greatest similarity to window 506 (as determined by finding the lowest distance between window descriptors) is taken to be the distance between the two images at location (i,j) even though the window in neighborhood 508 that produces this lowest distance might not actually be located at (i,j). Since a goal of the process of FIG. 1 is to find out whether the faces in two images contain similar features, the process of comparing a window in one image with several windows in a neighborhood in the other image—rather than merely comparing windows at the exact same spatial location—means that similar facial features in two images might be recognized even if these features do not appear in exactly the same place.

In formal language, these ideas can be expressed as follows. For each window in a first image, a distance is calculated, which represents how different that is from windows that are in about the same location in a second image. For a given window, identified by position (i,j), that distance can be expressed as d($\vec{f}_{ij}^{(1)}$). As will be recalled, a descriptor is calculated for each window, so the "distance" is a measure of how different the two descriptors are (which represents how different the visual information contained in the windows is). For a given location (i,j), d($\vec{f}_{ij}^{(1)}$) is the minimum distance between the descriptor for window (i,j) in the first image, and windows in the neighborhood of (i,j) in the second image. Thus, it can be said that $$d(\vec{f}_{ij}^{(1)}) = \min_{k,l:|i\cdot s-k\cdot s|\leq r,|j\cdot s-l\cdot s|\leq r} \left\| \vec{f}_{ij}^{(1)} - \vec{f}_{kl}^{(2)} \right\|$$

Or, in other words, window (i,j) in the first image is compared with all windows (k,l) in the second image such that (k,l) is no more than r pixels away from (i,j) in the vertical and horizontal directions. (It will be recalled that s is a parameter that determines how many pixels apart the windows are from each other.) In one example, the neighborhood comparison considers windows that are up to four pixels away in any direction from (i,j). In such a case, neighborhood 508 is defined by the rectangle whose corners are (i−4,j−4), (i−4,j+4), (i+4,j−4), and (i+4,j+4).

Figure 6:
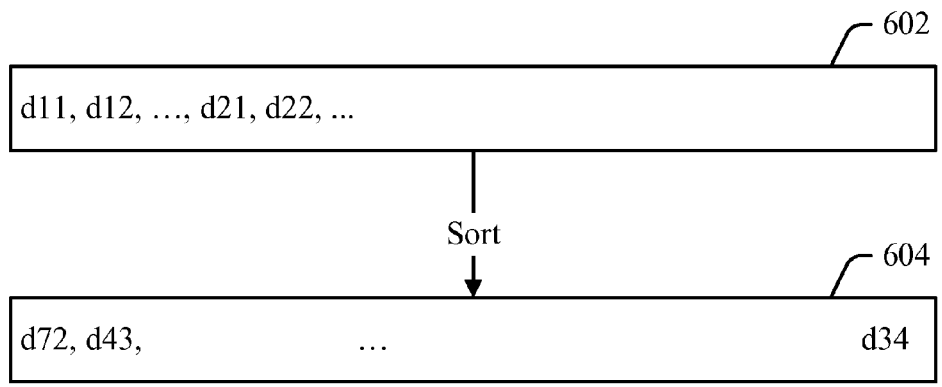
FIG. 6 is a block diagram of a list of distances, and of the sorting of that list.

After all of the distances $\vec{f}_{ij}^{(1)}$ have been calculated, what results is a set of distances, $d_{ij}$, where the set contains one distance for each window position. These distances can be sorted, as described in block 116 of FIG. 1. FIG. 6 shows an example in which distances are sorted.

Distances 602 are a set of distances that appear in the order in which the windows are numbered in an image. Thus, in distances 602, the distances appear in the order $d_{11}, d_{12}, \ldots, d_{21}, d_{22}, \ldots$. Distances 602 are sorted by value from lowest to highest, thereby producing sorted distances 604. For example, if the smallest distance in distances 602 is distance $d_{72}$, then $d_{72}$ appears first in sorted distances 604. If distance $d_{43}$ is the second smallest distance in distances 602, then distance $d_{43}$ appears second in sorted distances 604. And so on, so that sorted distances 604 contains the same list of distances that appear in distances 602, but in sorted order.

Figure 7:
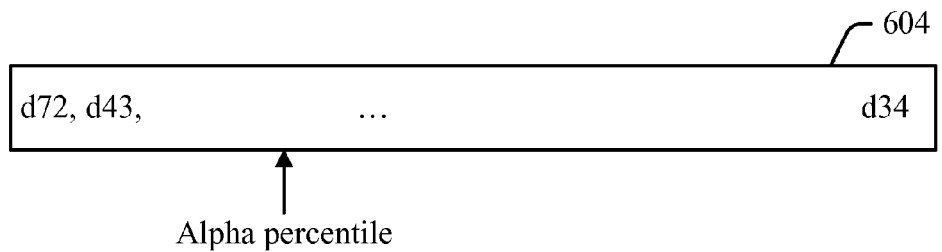
FIG. 7 is a block diagram of a sorted list of distances, and the choice of an alpha-th percentile element of that list.

Once the distances between windows have been sorted, one of these distances is picked to represent the distance between the two images, as described above in block 118 of FIG. 1. The picking of a distance is shown in FIG. 7. As can be seen in FIG. 7, the alpha-th percentile distance (or, rather, a distance that appears nearest to alpha percent along the sorted list from left to right) is picked to represent the distance between the two images. Alpha may be represented as a value between zero and one (or zero and one-hundred, or on some other scale). In the examples that follow, it will be assumed that alpha is represented on a scale of zero to one. At one extreme, where alpha is zero, the lowest distance among sorted distances 604 is used to represent the distance between two images. In effect, when alpha is zero, the distance between two images is the distance between their most similar windows. Thus, if two images have any windows that are relatively similar to each other, then the distances between the images would be small—even if the images have many dissimilar windows. At the other extreme, where alpha is one, the distance between two images is highest distance among distances 604. In this case, if the two images differ significantly at any window, then a distance would be chosen that indicates the images are quite different. Thus, when alpha is one, two images would be found to be similar only if they are similar everywhere. In one example, alpha is chosen so that images that have some features in common would be found to be similar, while images that are by-and-large different from each other would be recognized as being different. In other words, alpha is chosen such that two images will be called similar even if they have some windows that are quite different from each other, as long as some proportion of the windows are similar. For example, suppose that alpha is set at 0.2 (or 20%). Then, the distance between the windows is chosen as the value that appears roughly one-fifth of the way from the lowest to highest value in sorted distances 604. If at least 20% of the windows in the two images are similar to each other, then the distance chosen will indicate that the images are quite similar to each other. On the other hand, if only 10% of the windows are similar across images, then the low distances in the sorted list of distance will occupy only the left 10% of the sorted list, so the distance that lies 20% across that list will be a high distance. That high distance would be chosen to represent the difference between the two images, which would be appropriate if the images have very few windows that are similar to each other. Note that there are other methods of selecting the alpha-th percentile distance, which could be used. One such method is QuickSelect. QuickSelect could be used to select the alpha-th percentile distance without sorting. In general, any technique may be used to select the alpha-th percentile distance, and the subject matter herein is not limited to any particular technique.

Figure 8:
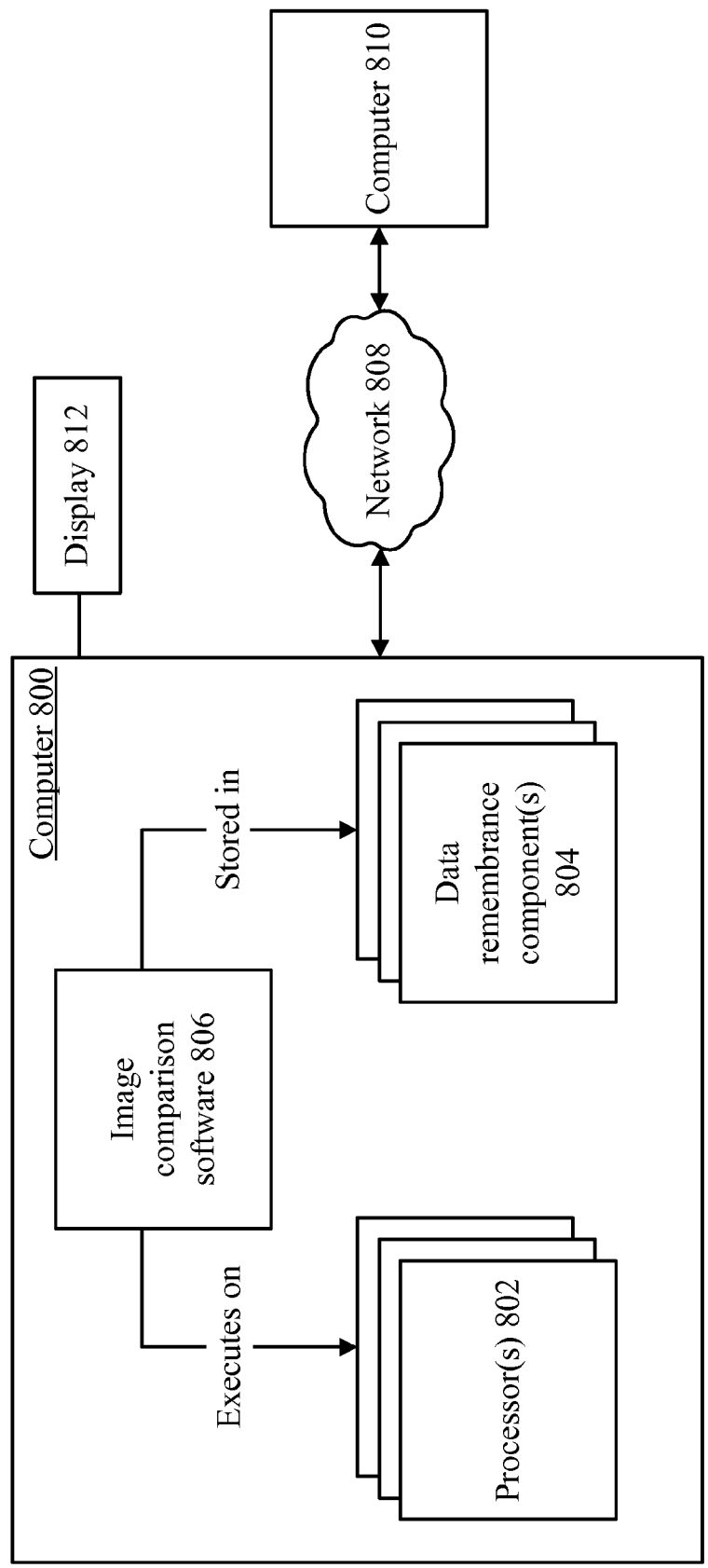
FIG. 8 is a block diagram of example components that may be used in connection with implementations of the subject matter described herein.

FIG. 8 shows an example environment in which aspects of the subject matter described herein may be deployed.

Computer 800 includes one or more processors 802 and one or more data remembrance components 804. Processor(s) 802 are typically microprocessors, such as those found in a personal desktop or laptop computer, a server, a handheld computer, or another kind of computing device. Data remembrance component(s) 804 are components that are capable of storing data for either the short or long term. Examples of data remembrance component(s) 804 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 800 may comprise, or be associated with, display 812, which may be a cathode ray tube (CRT) monitor, a liquid crystal display (LCD) monitor, or any other type of monitor.

Software may be stored in the data remembrance component(s) 804, and may execute on the one or more processor(s) 802. An example of such software is image comparison software 806, which may implement some or all of the functionality described above in connection with FIGS. 1-7, although any type of software could be used. Software 806 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 8, although the subject matter described herein is not limited to this example.

The subject matter described herein can be implemented as software that is stored in one or more of the data remembrance component(s) 804 and that executes on one or more of the processor(s) 802. As another example, the subject matter can be implemented as instructions that are stored on one or more computer-readable storage media. (Tangible media, such as an optical disks or magnetic disks, are examples of storage media.) Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 802) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 800 may be communicatively connected to one or more other devices through network 808. Computer 810, which may be similar in structure to computer 800, is an example of a device that can be connected to computer 800, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to recognize a face, wherein the executable instructions, when executed by a computer, cause the computer to perform acts comprising:
   detecting, in a first image, a first region that contains a first face;
   performing a geometric rectification on said first region;
   performing a photometric rectification on said first region;
   calculating a plurality of first descriptors of said first image by evaluating overlapping windows of said first image, wherein a descriptor is calculated for each window;
   comparing said first descriptors to a plurality of second descriptors, said plurality of second descriptors being calculated from windows of a second region of a second image that contains a second face, wherein said comparing produces a plurality of distances comprising a distance for each window location of said first region and said second region;

choosing one of said distances to represent a difference between said first face and said second face; and determining, based on said difference, whether said first face and said second face are of a same person.

2. The one or more computer-readable storage media of claim 1, wherein said performing of said photometric rectification comprises:

calculating a first blurred version of said first region using a first Gaussian blur kernel;

calculating a second blurred version of said first region using a second Gaussian blur kernel; and calculating a difference between said first blurred version and said second blurred version.

3. The one or more computer-readable storage media of claim 1, wherein said performing of said geometric rectification comprises:

detecting a position of one or more eyes of said first face; and warping said first region to change the position of said eyes.

4. The one or more computer-readable storage media of claim 3, wherein said warping of said first region to change the position of said eyes aligns the position of said eyes in said first face within said first region to the position of eyes in said second face within said second region.

5. The one or more computer-readable storage media of claim 1, wherein said comparing of said first descriptors with said second descriptors comprises:

comparing a descriptor calculated from a window at a first location of said first region with descriptors of calculated from windows within a neighborhood of said first location in said second region in order to calculate a distances between said window of said first region at said first location and windows of said second region within said neighborhood.

6. The one or more computer-readable storage media of claim 5, wherein said acts further comprise:

choosing a lowest one of the distances calculated between said window of said first region and windows of said second region within said neighborhood as the distance between said first image and said second image at said first location.

7. The one or more computer-readable storage media of claim 1, wherein said acts further comprise:

sorting said plurality of distances to create a set of sorted distances.

8. The one or more computer-readable storage media of claim 7, wherein said acts further comprise:

choosing one of said distances based on an alpha-th percentile in said sorted distances.

9. A method of comparing a first image to a second image, the method comprising:

using a processor to perform acts comprising:

performing a geometric rectification on said first image;

performing a photometric rectification on said first image;

calculating a descriptor for a plurality of windows of each of said first image and said second image, each window having a size, there being at least two of said plurality of windows that cover overlapping regions, wherein each window has a location within said first image or said second image;

comparing a window at each location of said first image with one or more windows of said second image to produce a distance, at each location, between said first image and said second image, thereby producing a plurality of distances between said first image and said second image;

choosing one of said plurality of distances as a difference between said first image and said second image; and using said difference to determine whether a first object in said first image is the same object as a second object in said second image.

10. The method of claim 9, wherein said first object is a first face, wherein said second object is a second face, and wherein said using of said difference to determine whether said first object is the same object as said second object comprises determining whether said first face and said second face are faces of the same person.

11. The method of claim 10, wherein said geometric rectification comprises:

detecting positions of first eyes in said first face; and warping said first image so that said positions of said first eyes match positions of second eyes in said second face.

12. The method of claim 9, wherein said photometric rectification comprises:

calculating a first blurred version of said first image using a first Gaussian blur kernel;

calculating a second blurred version of said second image using a second Gaussian blur kernel; and calculating a difference between said first blurred version and said second blurred version.

13. The method of claim 9, wherein said comparing of a window at each location of said first image with one or more windows of said second image to produce a distance comprises:

comparing a first window at a first location of said first image with a plurality of windows within a neighborhood of said first location in said second image, to produce a plurality of first distances;

finding a minimum one of said first distances; and using said minimum one of said first distances as the distance between said first image and said second image at said first location.

14. The method of claim 9, wherein said acts further comprise:

sorting said plurality of distances to produce sorted distances.

15. The method of claim 14, wherein said choosing of one of said plurality of distances as a difference between said first image and said second image comprises:

choosing one of said distances based on where, in said sorted distances, an alpha-th percentile is.

16. A system for determining whether a first face and a second face are faces of the same person, the system comprising:

a processor;

a data remembrance component;

a component that is stored in said data remembrance component and that executes on said processor, wherein the component geometrically rectifies said first face, photometrically rectifies said first face, calculates first descriptors for overlapping windows in a first image that contains said first face, calculates second descriptors for overlapping windows in a second image that contains said second face, makes a comparison of a descriptor of a window in said first image with one or more descriptors of windows in said second image and, based on said comparison, calculates distances for each window location in said first image and said second image, and wherein said component chooses one of said distances to represent a difference between said first face and said second face, and determines whether said first face and said second face are faces of the same person based on said difference.

17. The system of claim 16, wherein said component photometrically rectifies said first face by calculating a first blurred version of said first face and a second blurred version of said first face, and calculating a difference between said first blurred version and said second blurred version, said second blurred version being different from said first blurred version.

18. The system of claim 16, wherein said component geometrically rectifies said first face by detecting first positions of first eyes in said first face and warping said first face so that said first positions of said first eyes in said first face are aligned with second positions of second eyes in said second face.

19. The system of claim 16, wherein said component makes said comparison of said descriptor of said window in said first image with one or more descriptors of windows in said second image by finding windows, in said second image, that are in a neighborhood of a location at which said window in said first image is located, calculating first distances between said window and all windows in said neighborhood, and finding a minimum distance among said first distances.

20. The system of claim 16, wherein said component sorts said distances to produce sorted distances and chooses one of said distances to represent the difference between said first face and said second face, said component choosing one of said distances based on where, in said sorted differences, an alpha-th percentile is, for a given value of alpha.

* * * * *